United States Patent [19]

Matonte

[11] Patent Number: 5,069,883
[45] Date of Patent: Dec. 3, 1991

[54] DEVICE FOR CONTINUOUS CONTACTING OF LIQUIDS AND SOLIDS

[75] Inventor: Philip J. Matonte, Seffner, Fla.

[73] Assignee: Progress Water Technologies Corp., St. Petersburg, Fla.

[21] Appl. No.: 424,819

[22] Filed: Oct. 20, 1989

[51] Int. Cl.⁵ .................... B01D 11/02; E03D 5/00
[52] U.S. Cl. .................... 422/269; 137/624.11; 137/625.16; 137/627; 141/104; 141/105; 141/234; 141/284; 422/255; 422/261; 422/296
[58] Field of Search ................ 422/255–257, 422/261, 269, 296, 103; 137/625.11, 625.16, 627; 435/287, 289; 141/104–105, 234, 284

[56] References Cited

U.S. PATENT DOCUMENTS

| | | | |
|---|---|---|---|
| 2,639,000 | 6/1951 | Edwards | 55/179 |
| 2,706,532 | 4/1955 | Ringo et al. | 137/625.15 |
| 2,918,938 | 12/1959 | Kimball | 137/625.15 |
| 2,997,068 | 8/1961 | Roos | 137/625.15 |
| 3,137,494 | 6/1964 | Pendley et al. | 270/58 |
| 3,198,004 | 8/1965 | Roberts et al. | 137/625.15 |
| 3,329,166 | 4/1967 | Kiernan | 137/625.16 |
| 3,706,812 | 12/1970 | Derosset et al. | 585/222 |
| 4,259,288 | 3/1981 | Welch | 422/103 X |
| 4,574,842 | 3/1986 | Cordova | 137/625.15 X |
| 4,700,745 | 10/1987 | Ellis | 137/625.11 |
| 4,764,276 | 8/1988 | Berry et al. | 210/264 |

Primary Examiner—Robert J. Warden
Assistant Examiner—Amalia Santiago
Attorney, Agent, or Firm—Burns, Doane, Swecker & Mathis

[57] ABSTRACT

A liquid-solid contacting device having a plurality of chambers communicating with a cylindrical valve. The valve is situated in the central axis of the device and provides distribution and collection of a liquid to and from each of the plurality of chambers. The present invention provides an evenly distributed and adjustable pressure on sliding surfaces that substantially prevent leakage of process fluid.

8 Claims, 5 Drawing Sheets

Fig. 8

DEVICE FOR CONTINUOUS CONTACTING OF LIQUIDS AND SOLIDS

BACKGROUND OF THE INVENTION

The present invention relates to a liquid-solid or a gas-solid contacting apparatus for performing processes typically performed by batch process devices. In particular, the present invention relates to a liquid-solid contacting apparatus for performing physical and chemical processes by liquid-solid contacting operations in a continuous manner.

Batch process devices typically are of the fixed-bed design which usually includes a vertical cylindrical tank equipped with a resin support-liquid collection system located below the resin level and a distribution system above the resin level. The distribution and collection systems are critical design features since the liquid in fixed-bed devices must be delivered uniformly over the total surface of the resin bed to prevent disruption of the level of the bed. Otherwise, the necessary uniform collection of the liquid leaving the bottom layer of resin is hampered.

Although fixed-bed systems are the most widely used, they suffer from several significant disadvantages. First, the actual reaction of any particular step in a process uses only a portion of the total volume of resin in the system and thus, the total resin volume necessary for the entire process is considerably larger than what is needed at any one time. Additionally, the resin must be periodically cleaned and regenerated thus causing a considerable amount of wasted downtime. Yet further, as the entire process progresses, the fluid concentration will become increasingly diluted thus causing the reactions of each additional step to become less efficient.

To solve some of the above-identified problems, devices known as continuous contactors have been developed wherein the resin and the fluid pass through each other in opposing currents. Continuous contactors typically are designed to have a series of columns or a series of fluidized beds. In those continuous contactors having a series of columns, resin is moved up or down through contacting zones within the columns by periodic pulsing of pressure or a vacuum while solutions flow through the resins between pulses. In fluidized bed systems, the pulsed exchanges take place with non-compacted resin wherein the resin may fall down through a baffled column against an upflow stream of the fluid. In a fluidized bed-system, the exchange may also take place in stirred compartments or troughs where the resin is forwarded mechanically against the flow of solution. In such systems, substantially steady state zones are created so as to perform the particular steps of exhaustion, regeneration and intermediate rinsing of the resin. As a result of such a design, the volume of resin needed for a particular process can be reduced since the resin is utilized more efficiently. This design also allows for the treatment of a greater volume of concentrated solutions than possible with fixed bed systems.

The continuous contactors of the column or fluidized bed design are, however, not without drawbacks since a true steady state profile is not actually achieved. Since a process is performed according to a series of pulses, the flows from step to step are periodically interrupted. These interruptions disrupt any true steady state that may otherwise be achieved. Furthermore, since the amounts of fluid used in each pulse are necessarily of a finite volume, an adequate equilibrium will not always be obtained. This inadequate equilibrium is also due, in part, to the change in effectivity of the resin that occurs with each subsequent pulse.

In response to such drawbacks, more refined continuous contactors have been developed that better provide for steady state processing and, thus, for yet even more efficient operation. An example of such a more refined continuous contacting device is disclosed in U.S. Pat. No. 4,764,276 issued to Berry et al.

Disclosed in the Berry et al. patent is a device consisting of thirty independent vessels arranged in a circularly shaped structure, or carousel, which creates a continuously repeating assembly line. At the center of the carousel are located two valves, one above the vessels and one below the vessels. Each valve has twenty stationary ports that are connected to fluid sources associated with each desired step in a process. Each valve also has thirty rotating ports that are each attached to one of the thirty vessels.

With this arrangement, the fluid needed for each of the steps in a twenty step process may flow continuously through the twenty fixed ports. Then, as each of the thirty ports connected to each of the vessels pass by the fixed ports due to the rotation of the carousel, each vessel will be continuously subjected to a step in the process. The speed of rotation of the carousel determines the time each tank remains under each stationary port and thus the time in that particular step in the process. The number, size and shape of the ports and vessels may vary depending on the process.

In this manner, the flows for each step are not interrupted by periodic pulsing as is found in the column or fluidized-bed systems thus providing a more efficient utilization of the fluid and resin. Furthermore, an environment more conducive to producing steady state reactions is produced.

Notwithstanding the greater efficiency obtained with devices such as that disclosed in the Berry et al. patent, however, such devices are known to have inherent drawbacks due to complexity and cost. In particular, the valves used for distributing and collecting the fluid above and below the vessels, respectively, become economically prohibitive for certain processes due to complexity and, therefore, cost. The use of two valves also contributes undesirably to the weight and added structural components of the device. For example, for processes requiring upwards of twenty steps for each of thirty or more vessels, a minimum of sixty inlet and outlet channels must be designed within the carousel structure. Mounting the two valves both above and below the vessels also adds undesirably to the height of the contacting device due to the necessary support structure.

SUMMARY AND OBJECTS OF THE INVENTION

In view of the foregoing limitations and shortcomings of prior art devices as well as other disadvantages not specifically mentioned above, it is apparent that a need exists in the art for a continuous contacting device which achieves a high degree of reaction efficiency yet which is not economically prohibitive to produce.

It is therefore an object of this invention to fulfill that need by providing an apparatus for continuous contacting which provides a highly efficient utilization of resin and fluid and that is economically viable to produce.

Another object of this invention is to provide a liquid-solid contacting method and apparatus which is capable of substantially continuous operation and allows for the uninterrupted flows of all feed, drain, regeneration and washing streams without the need for complicated valving arrangements.

It is a further object of this invention to provide a liquid-solid contacting method and apparatus which can be readily adapted to perform in a variety of processes.

Yet another object of this invention is to provide a liquid-solid contacting apparatus wherein an exposure of fluid to fresh resin is maximized and exposure of fluid to spent resin is minimized.

A further object of this invention is to provide a continuous contacting device using a minimum number of parts and a minimum amount of support structure.

A further object of this invention is to provide a valve for a continuous contacting apparatus providing an evenly distributed and adjustable pressure on sliding surfaces that substantially prevents leakage of process fluid.

These objects and other objects not specifically mentioned above are accomplished in accordance with a preferred embodiment of the present invention by a liquid-solid contacting device that includes a plurality of chambers adapted for containing solid particulate materials. The plurality of chambers are mounted on a rotatable carriage such that the chambers are arranged around a central axis of the liquid-solid contacting device. A cylindrical valve situated along the central axis of the device provides distribution and collection of a liquid to and from each of the plurality of chambers. A drive means is included for rotating the rotatable carriage.

BRIEF DESCRIPTION OF THE DRAWINGS

A preferred embodiment of the invention is illustrated and described in the accompanying drawings wherein like numbers refer to like parts and in which.

All drawings are shown for illustrative purposes only and it will be appreciated that a wide number of various configurations or modifications to this basic concept are possible and are within the general scope of this invention.

DETAILED DESCRIPTION

Figure 1:
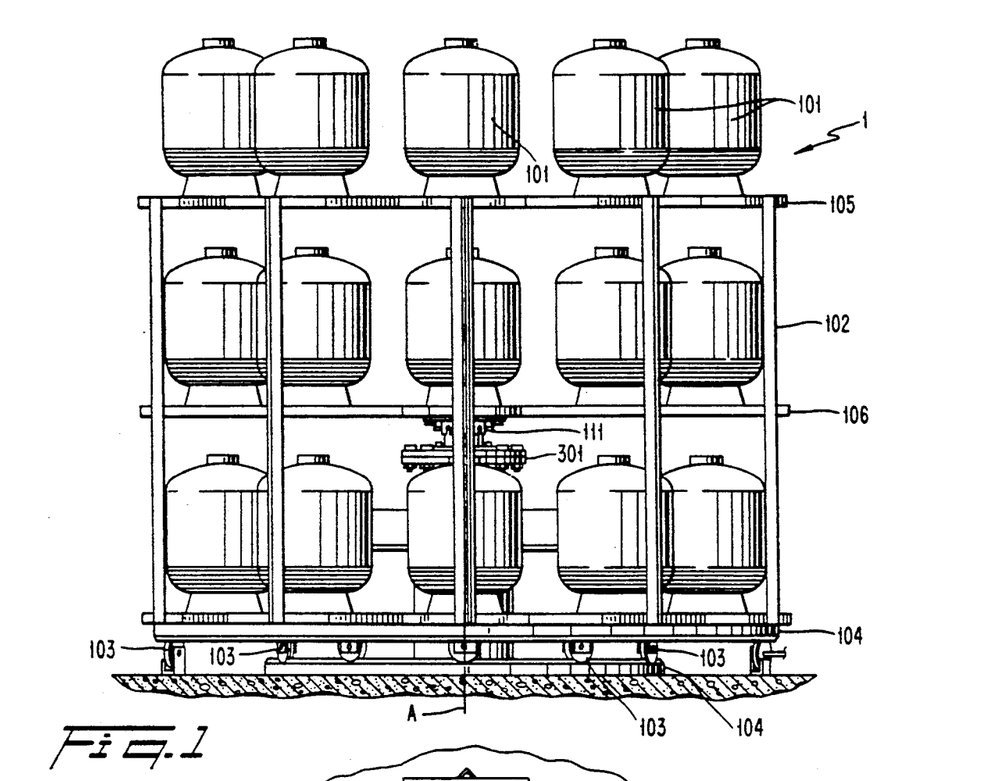
FIG. 1 is a front view of a preferred embodiment of a liquid-solid contacting device of the present invention.

In FIG. 1, a preferred embodiment of a liquid-solid contacting device 1 of the present invention is shown.

The device 1 includes a plurality of resin-filled vessels 101 that are mounted on three different platforms 105, 106, 107. The platforms, in part, make-up carousel 102 which is circular in geometry around an axis A. The carousel 102 is rotatable around axis A by rollers 103 which are located underneath the platform 107 and which are guided in a circular direction by track 104. The carousel 102 is caused to rotate by an electric motor (not shown).

Figure 2:
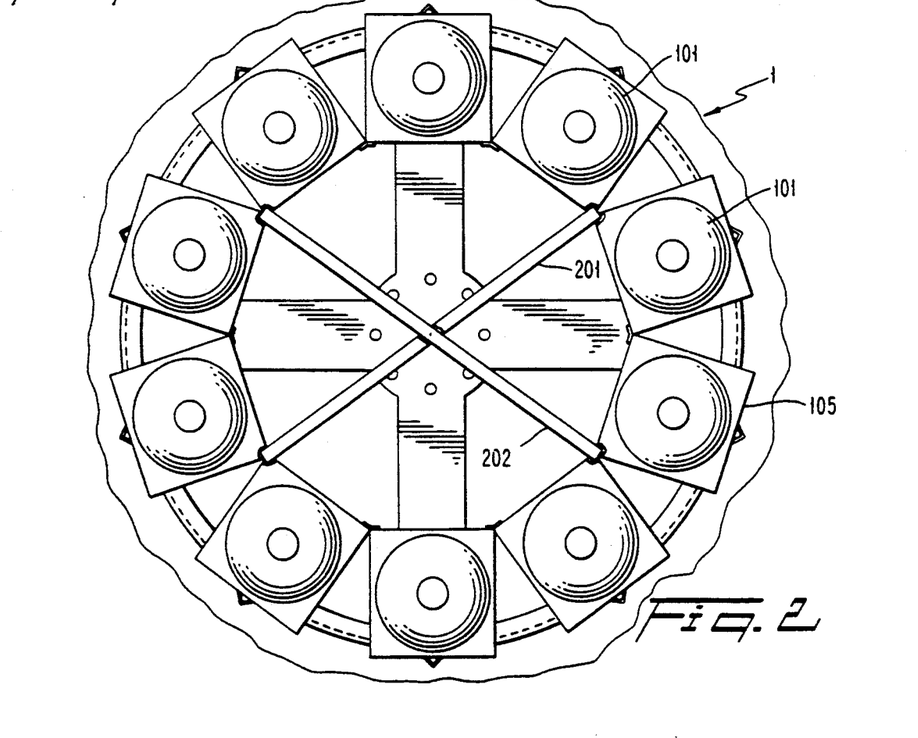
FIG. 2 is a top view of the liquid-solid contacting device of FIG. 1.

A top view of the liquid-solid contacting device 1 of FIG. 1 is shown in FIG. 2 wherein the uppermost platform 105 is shown as being horizontally supported by supports 201, 202. In a preferred embodiment of the present invention, a total of ten vessels 101 are mounted on the upper most platform 105. Consequently, since a preferred embodiment of the present invention has three platforms 105, 106, 107 (FIG. 1), a total of thirty vessels 101 are situated on the liquid-solid contacting device 1.

Figure 3:
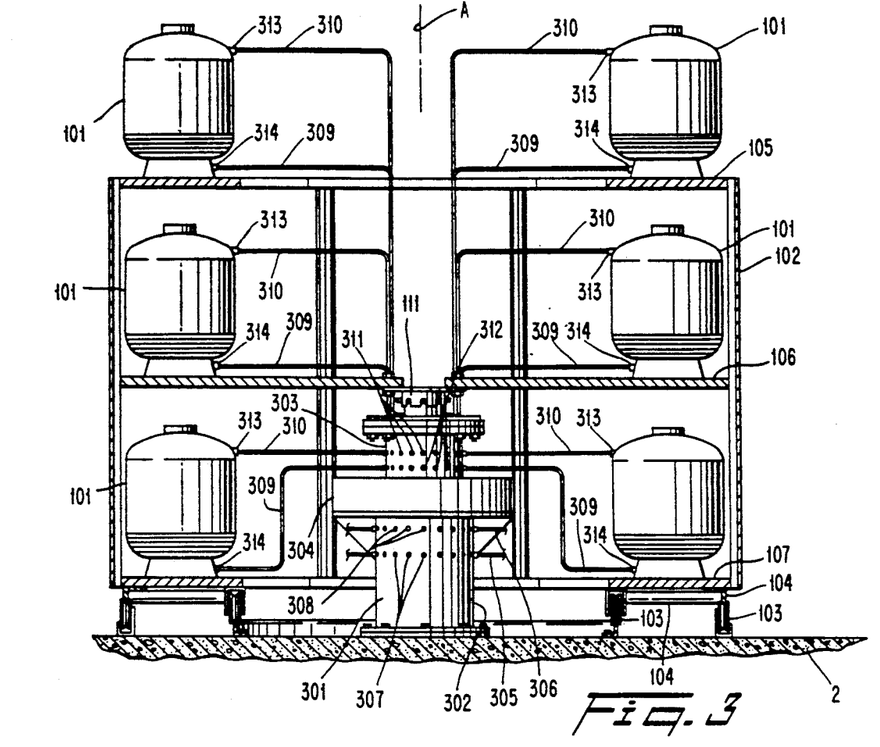
FIG. 3 is a cross-sectional view of the liquid-solid contacting device of FIG. 1.

A cylindrical valve 301 is situated concentrically around axis A as shown in a cross-sectional view of the liquid-solid contacting device 1 in FIG. 3. The cylindrical valve 301 includes a stationary cylinder 302 that is fixed to the floor 2 and a rotating cylinder 303 that is linked to the middle level platform 106 of the carousel 102. To maintain valve alignment, the rotating cylinder 303 is linked to the platform 106 by a cap assembly 111 that includes a pin and groove linkage configuration. Attached to the stationary cylinder 301 is the driving linkage housing 304 which houses the mechanism by which the carousel 102 is driven.

Circumferentially spaced at equal increments on the stationary cylinder 301 are stationary inlet ports 307 and stationary outlet ports 308. Connected to each of the stationary inlet ports 307 and each of the stationary outlet ports 308 are stationary inlet tubes 305 and the stationary outlet tubes 306, respectively. The stationary inlet and outlet tubes 305, 306 are connected to the source(s) of fluid (not shown), which provide the liquid needed for each step of a process to be performed. In a preferred embodiment of a twenty step process, there are twenty stationary inlet ports and tubes 307, 305 and twenty stationary outlet ports and tubes 308, 306.

Circumferentially spaced at equal intervals on the rotating cylinder 303, are rotating inlet ports 311 and rotating outlet ports 312. Connected to each of the rotating inlet and outlet ports 311, 312 are corresponding rotating inlet and outlet tubes 310, 309. Further, each of the rotating inlet tubes 310 are connected to a vessel inlet 313 and each of the rotating outlet tubes 309 are connected to a vessel outlet 314. In a preferred embodiment, there are thirty rotating inlet ports 312 and thirty rotating outlet ports 312 and each rotating inlet an outlet pair corresponds to one of the thirty vessels 101.

Figure 4:
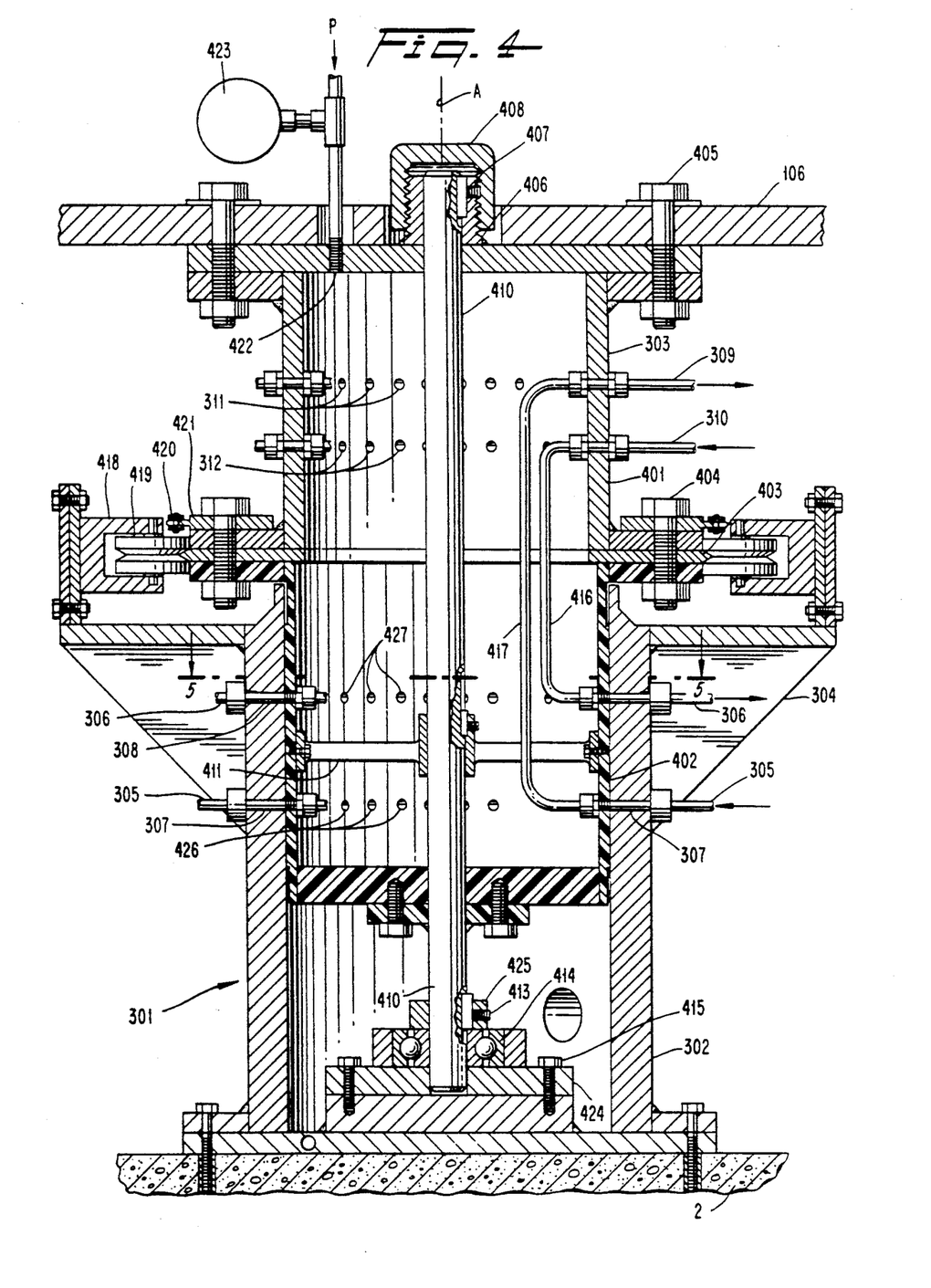
FIG. 4 is a cross-sectional view of a cylindrical valve of the liquid-solid contacting device of FIG. 1.

A more detailed drawing of the cylindrical valve 301 is shown in a cross-sectional view of the valve as depicted in FIG. 4. In FIG. 4 the rotating cylinder 303 is shown to include an upper portion 401 and a lower portion 402 wherein a roller guide plate 403 is sandwiched therebetween. The upper and lower portions 401, 402 are connected to each other by a fastener 404 and the lower portion 402 is located substantially within a hollow portion of stationary cylinder 302.

The upper portion 401 of the rotating cylinder 303 is attached to the platform 106 of the carousel 102 by fasteners 405. Mounted in the center of the platform 106 and concentric with axis A is threaded bushing 406 which is fastened to the top end of a cylindrical valve axis-rod 410 by set screw 407. The entire assembly of the cylindrical valve axis-rod 410, the threaded bushing 406 and the set screw 407 are enclosed by cap 408. In this manner, the upper portion 401 of the cylindrical valve 301 is fixedly connected to the platform 106, which, in turn, is connected to the cylindrical valve axis-rod 410.

The lower portion 402 of the rotating cylinder 303 is attached to cylindrical valve axis-rod 410 by support plate 411 which is attached to the rod 410 by a set screw 412. This connection reinforces the attachment of rotating cylinder 303 to cylindrical valve axis-rod 410.

At the bottom portion of rod 410 is attached a bushing 425 by set screw 413. The bushing 425 rests on the inner face of bearing 414 which, in turn, rests on block 424. Block 424, in turn, is attached to plates that ultimately rest on the floor 2. In this manner, the cylindrical valve axis-rod 410 is longitudinally and rotatably situated within the cylindrical valve 301.

The rotatable cylinder 303 is rotated by the linkage mechanism disposed within the housing 304. The mechanism includes a sprocket 421 which is fixedly connected to the rotating cylinder 303 by a fastener 404 and is driven by a chain 420. The chain 420 is, in turn, driven by an electric motor (not shown). The mechanism also includes guide rollers 419 which are attached to the housing 304 by a roller bracket 418. The guide rollers 419 are designed to have mating bevelled surfaces which serve to interface with a roller guide plate 403 which is, itself, sandwiched between the upper and lower portion 401, 402 of rotating cylinder 303.

When the electric motor (not shown) is energized to drive chain 420, the rotating cylinder 303 and carousel 102 are caused to rotate since the cylinder 303 is fixedly attached to the sprocket 421. As the cylinder 303 rotates, it is guided by guide roller 419 which interface with guide plate 403. The guiding mechanism prevents undue radial movement of the rotating cylinder 303.

Disposed within the rotating cylinder 303 are a plurality of transitional inlet and outlet tubes 417, 416 which correspond to a rotating inlet and outlet port 311, 312, respectively, in the upper portion 401 of the rotating cylinder 303. In the lower portion 402 of the rotating cylinder 303, each of the transitional inlet and outlet tubes 417, 416 are connected to internal rotating inlet and outlet ports 426, 427, respectively. There are thirty internal rotating outlet ports 427 and thirty internal rotating inlet ports 426, thus, via the transitional tubes 417, 416 each of the internal rotating ports are in fluid connection with a corresponding rotating port in the upper portion 401.

It is of note that, when the cylindrical valve is assembled, the internal rotating outlet ports 427 are circumferentially equally spaced on the lower portion 402 of rotating cylinder 303 in substantially the same horizontal plane as the stationary outlet ports 308. Similarly, when the cylindrical valve is assembled, the internal rotating inlet ports 426 are circumferentially equally spaced in substantially the same horizontal plane as the stationary inlet ports 307. Consequently, at any given instant of time during the rotation of rotating cylinder 303, a certain degree of fluid connection will be achieved between the stationary inlet and outlet ports 307, 308 and the internal rotating inlet and outlet ports 426, 427, respectively.

Figure 5:
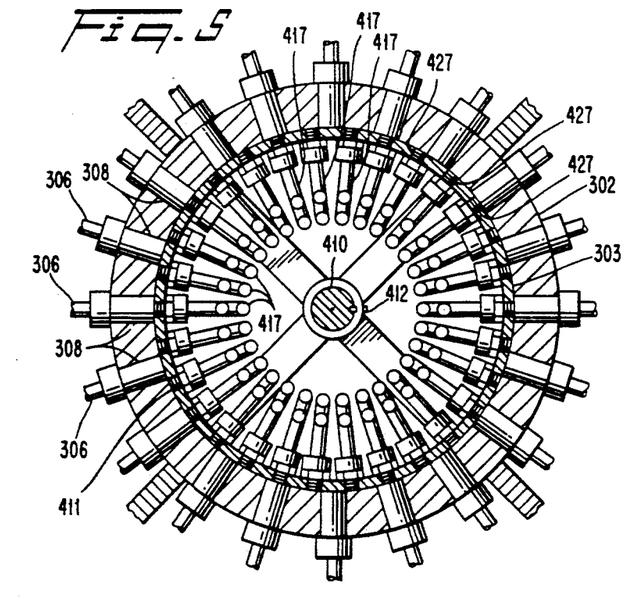
FIG. 5 is a cross-sectional view of the cylindrical valve of FIG. 4.

FIG. 5 shows a top cross-section of the cylindrical valve 301 through a horizontal plane that includes the stationary outlet ports 308 on the stationary cylinder 302 and the internal rotating outlet ports 427 on the lower portion 402 of the rotating cylinder 401. It is, of course, readily apparent from FIG. 5 that, since, in a preferred embodiment, there are thirty internal rotating outlet ports 427 and only twenty stationary outlet ports 308, there will never be a one-to-one correspondence between the stationary and rotating ports. Indeed, at any given instant during the rotation of cylinder 303, each of the rotating ports will have either a greater or lesser degree of fluid connection with the stationary ports than during another instant of time. Consequently, due to the varying degree of fluid connection between the stationary and rotating ports, the amount of flow in any particular internal rotating port will vary. In other words, with respect to FIG. 5, since the internal rotating outlet ports 427 are rotating with respect to the stationary ports 308 and also, in view of the fact that there is not one-to-one correspondence between the stationary and internal rotating ports, at any given time, a rotating port 427 may have a greater or lesser degree of fluid connection with the stationary port 308 than any other rotating outlet port 427. It is attempted to further describe this configuration in FIG. 10.

Figure 10:
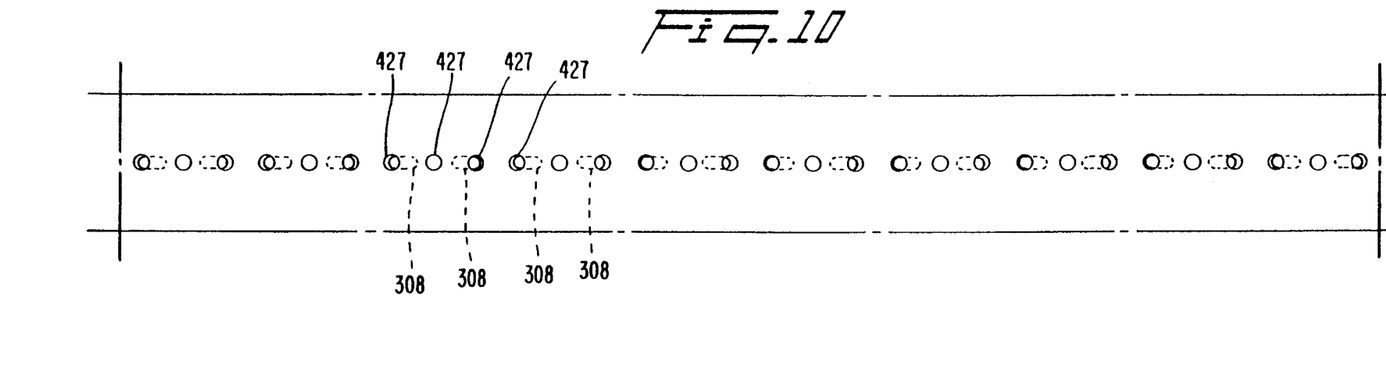
FIG. 10 is a linear depiction of the porting arrangement of the cylindrical valve of FIG. 4.

The series of ports depicted linearly in FIG. 10 are a characterization of the interface between the stationary outlet ports 308 and the internal rotating outlet ports 427 of FIG. 5. The circular interface between the ports has been drawn in a linear orientation in order to better describe the relationship of the ports that controls fluid flow. FIG. 10 shows a snapshot of the relationship between the stationary outlet ports 308 and the internal rotating outlet ports 427 wherein the internal rotating outlet ports 427 have been progressing to the right. From this snapshot, it is understood that at any given time, one of the internal rotating ports 427 may either be completely or only partially aligned with a stationary port 308. It can also be seen that, at any given time, portions of two internal rotating ports 427 may be partially aligned with the same stationary port 308. In this manner, the fluid that is communicated between a vessel fluidly connected to the internal rotating ports 427 and to the fluid sources connected to the stationary ports 308 is hereby controlled. The number, size and geometry of any of the ports may be changed depending on the process intended to be performed. In a preferred embodiment, the stationary outlet ports 308 are given an oblong shape as shown in FIG. 10.

Figure 6:
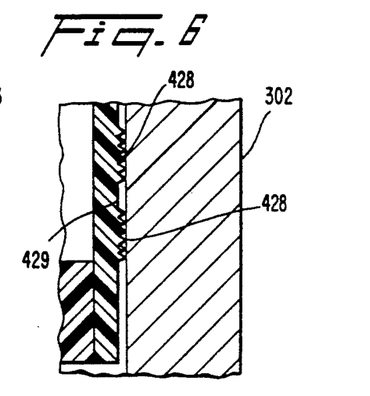
FIG. 6 is an enlarged view of a seal of the cylindrical valve of FIG. 4.

In order to ensure proper sealing and alignment between the lower portion 402 of rotating cylinder 303 and the stationary cylinder 302, a seal that is integral with the lower portion 402 may be disposed at various locations along the longitudinal length of lower portion 402. FIG. 6 depicts the structure which is representative of such a seal. The seal includes two sets of grooves 428 which are longitudinally disposed on the lower portion 402 and which are separated by a space 429. In a preferred embodiment, the two sets of grooves 428 are configured to have approximately 16 grooves per inch.

To further provide good sealing characteristics between the lower rotating portion 402 of rotating cylinder 303 and stationary cylinder 302, the rotating cylinder 303 may be pressurized with either gas or liquid. Referring to FIG. 4, the pressurization is achieved by opening pressure valve 423 to allow pressure from a pressure source P to enter the rotating cylinder 303 through port 422. The resulting pressurization forces the outer wall of the lower portion 402 of the rotating cylinder 303 to abut securely against the inner wall of the stationary cylinder 302. This provides an evenly distributed and adjustable pressure on the sliding surfaces between the two walls and ensures effective sealing between the stationary ports 307, 308 and the internal rotating ports 426, 427, respectively. Effective sealing is provided despite any minor out of roundness or imperfection that may exist in the cylinders.

FIGS. 1-6 and 10 depict a preferred embodiment of the present invention wherein a liquid-solid contacting device will continuously perform a twenty-step process in thirty resin-filled vessels. At the outset of the process, the electric motor (not shown) will be energized to cause the rotation of the rotating cylinder 303 of the cylindrical valve 301. Since the rotating cylinder 303 is fixedly connected to the platform 106, rotation will also be imparted to the carousel 102 which carries each of the vessels 101. At a time substantially in correspondence with the initiation of rotation of the carousel, each of the types of fluid associated with each of the twenty steps will be supplied to each of the corresponding twenty stationary inlet ports 307 through the stationary inlet tubes 305. The flow for each of the twenty steps is sequentially transmitted to each of the thirty internal rotating inlet ports 426 of the lower portion 402 of the rotating cylinder 401 according to the rotation of the rotating cylinder 401 induced by the electric motor (not shown). (See also FIG. 7).

The fluid communicated to each of the internal rotating inlet ports 311 is channeled to the rotating inlet ports 311 by the inlet transitional tubes 417 and then delivered to the inlet 313 of each vessel 101 by rotating inlet tubes 310. The fluid for each step then undergoes the reaction for that particular step with the resin contained within each vessel 101. Following the reaction, the resulting fluid exits each of the vessels 101 at the outlet 314 of each vessel and flows to a corresponding rotating outlet port 312 of the upper portion 401 of rotating cylinder 303 through rotating outlet tubes 310. Flowing to the internal rotating outlet ports 427 through the transitional outlet tubes 416, the fluid from each of the vessels 101 is then sequentially communicated to the stationary outlet ports 308 according to the rotation of the rotating cylinder 303. The stationary outlet tube 306 for each stationary outlet port 308 channels the fluid from each step to other containers (not shown) for further use in the process or to a reservoir (not shown).

In this manner, the twenty step process is thus continuously performed in each of the thirty vessels 101 thus utilizing the resin within each vessel efficiently. Furthermore, the continuous operation of the process is conducive to providing a steady state reaction in each of the vessels. Yet still further, since one cylindrical valve provides distribution and collection of the fluid for each step, the complexity, weight and cost of the liquid-solid contacting device is reduced in comparison with previous devices. The cylindrical valve also prevents unnecessary waste or loss of fluid since sufficient sealing between rotating and stationary ports is provided by the internal pressurization of the rotating cylinder of the cylindrical valve.

Figure 7:
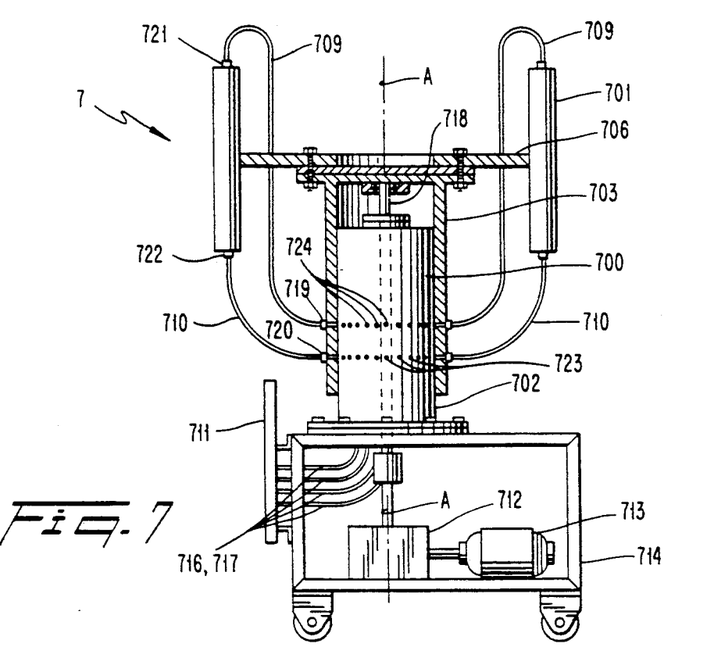
FIG. 7 is a first alternative embodiment of the present invention.
Figure 8:
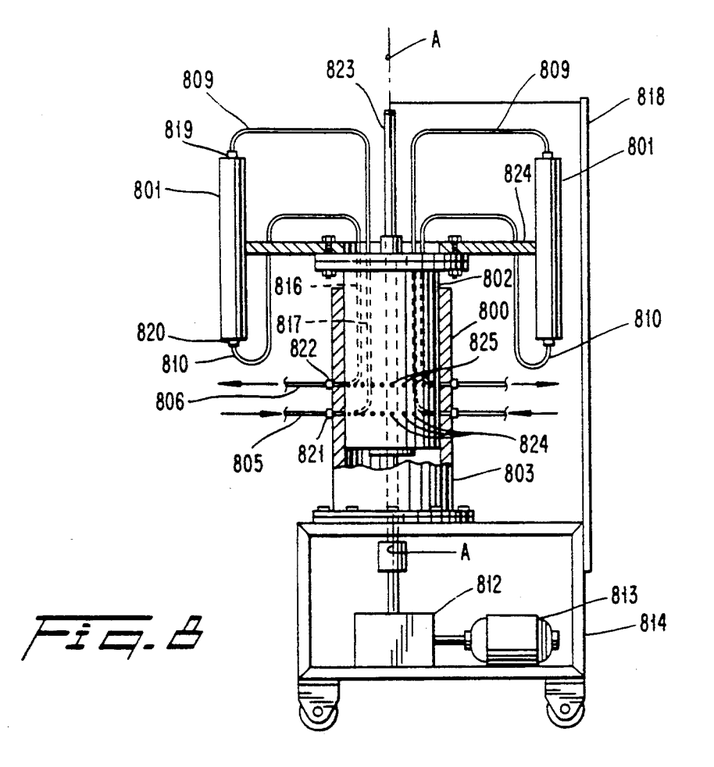
FIG. 8 is a second alternative embodiment of the present invention.
Figure 9:
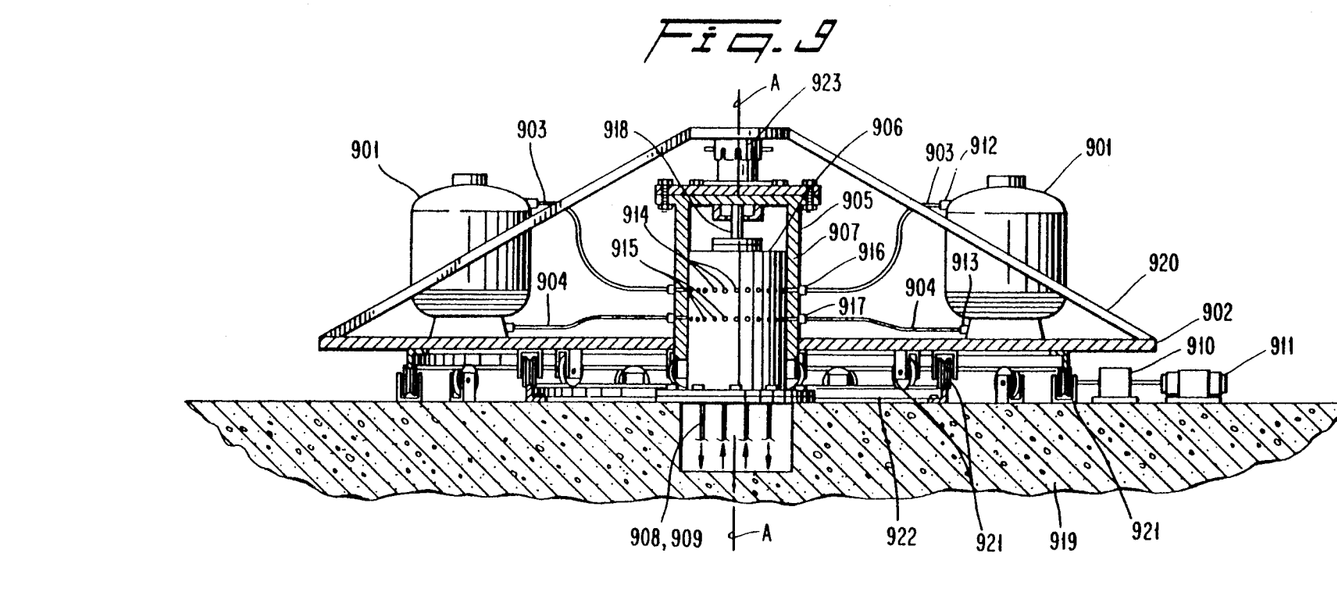
FIG. 9 is a third alternative embodiment of the present invention.

In FIGS. 7, 8 and 9 are shown three alternative preferred embodiments of the present invention wherein the relationship between stationary ports and rotating ports of the cylindrical valve is substantially the same as for the embodiment previously described. However, as exemplified by these alternative preferred embodiments, various structural changes can be made without departing from the spirit of the invention which is intended to be protected.

FIG. 7 shows a liquid-solid contacting device 7 of a second preferred embodiment of the present invention. The device 7 includes a plurality of resin filled vessels 701 that are mounted on a platform 706. The platform 706 is connected to a rotating outer cylinder 703 of a cylindrical valve 700. The outer rotating cylinder 703 rotates about a stationary inner cylinder 702 which, in turn, is attached to the frame of a cart 714.

Mounted to the cart 714 is a motor 713 and a reduction drive 712. Attached to the reduction drive 712 is a cylindrical valve shaft 718 which, in turn is fixed to the outer rotating cylinder 703. The motor 713, when energized, drives the shaft 718 and, thus, the outer rotating cylinder 703 through the reduction drive 712.

Circumferentially spaced at equal intervals on the rotating cylinder 703, are rotating inlet ports 719 and rotating outlet ports 720. Connected to each of rotating inlet and outlet ports 719, 720 are corresponding rotating inlet and outlet tubes 709, 710. Further, each of the rotating inlet tubes 709 are connected to a vessel inlet 721 and each of the rotating outlet tubes 710 are connected to a vessel outlet 722.

Circumferentially spaced at equal increments on the stationary inner cylinder 702 are stationary inlet ports 724 and stationary outlet ports 723. Connected to each of these stationary inlet ports 724 and the stationary outlet ports 723 are corresponding inlet tubes 716 and outlet tubes 717. The stationary inlet and outlet tubes 716, 717 are connected to a input/output panel 711 which, in turn, is connected to a source(s) of fluid (not shown), which provide the liquid needed for each step of a process to be performed.

A second alternative embodiment is disclosed in FIG. 8. The device includes a plurality of resin-filled vessels 801 that are mounted on a platform 824. The platform 824 is attached to an rotating inner cylinder 802 of the cylindrical valve 800. The rotating inner cylinder 802 rotates within a stationary outer cylinder 803, which, in turn, is attached to the frame of cart 814.

Within the cart 814, is mounted an electric motor 813 along with a reduction drive 812. Connected to the reduction drive 812 is a driving shaft 823 which, in turn, is connected to the rotating cylinder 802. When the electric motor 813 is energized, shaft 823 is driven through the reduction drive 812 and causes the rotating cylinder 802 to rotate. In this manner, the vessels 801 are caused to rotate.

Circumferentially spaced at equal increments on the stationary outer cylinder 803 are stationary inlet ports 821 and stationary outlet ports 822. Connected to each of the stationary inlet ports 821 and each of the stationary outlet ports 822 are stationary inlet tubes 805 and the stationary outlet tubes 806, respectfully. The stationary inlet and outlet tubes 805, 806 are connected to the source(s) of fluid (not shown) which provide the liquid needed for each step of a process to be performed.

Circumferentially spaced at equal intervals on the rotating cylinder 802, are rotating inlet ports 824 and rotating outlet ports 825. Connected to each of the rotating inlet and outlet ports 824, 825 are corresponding rotating inlet and outlet tubes 809, 810. Further, each of the rotating inlet tubes 809 are connected to a vessel inlet 819 and each of the rotating outlet tubes 810 are connected to a vessel outlet 820.

A third alternative embodiment is disclosed in FIG. 9. The device includes a plurality of resin-filled vessels 901 that are mounted on a platform 902. The platform, in part, makes up a carousel 920 which is circular in geometry around an axis A. The carousel 920 is rotatable around an axis A by rollers 921 which are located underneath the platform 902 and which are guided in a circular direction by a track 922. The carousel 920 is caused to rotate by an electric motor that drives one of the rollers 921 through a gear reducer 910.

A cylindrical valve 907 is situated concentrically around axis A. The cylindrical valve 906 includes a stationary cylinder 906 that is fixed to the floor 919 and a rotating cylinder 905 that is linked to the carousel 920. To maintain valve alignment, the rotating cylinder 905 is linked to the carousel 920 by a cap assembly 923 that includes a pin and groove linkage configuration.

Circumferentially spaced at equal intervals on the stationary cylinder 906 are stationary inlet ports 914 and stationary outlet ports 915. Connected to each of the stationary inlet ports 914 and each of the stationary outlet ports 915 are stationary inlet tubes 908 and stationary outlet tubes 909, respectively. The stationary inlet and outlet tubes 908, 909 are connected to the source(s) of fluid (not shown), which provide the liquid needed for each step of a process to be performed.

Circumferentially spaced at equal intervals on the rotating cylinder 905 are rotating inlet ports 916 in rotating outlet ports 917. Connected to each of the rotating inlet and outlet ports 916, 917 are corresponding rotating inlet and outlet tubes 903, 904. Further, each of the rotating inlet tubes 903 are connected to a vessel inlet 912 and each of the rotating outlet tubes 917 are connected to a vessel outlet 913.

When the electric motor 911 is energized, roller 921 is caused to rotate through the reduction gear 910. The roller 921 causes the carriage 920 and, in turn, the rotating outer cylinder 905 to rotate around axis A.

The principles, preferred embodiment and mode of operation of the present invention have been described in the foregoing specification. However, the invention which is intended to be protected is not to be construed as limited to the particular embodiment disclosed. The embodiment is to be regarded as illustrative rather than restrictive. Variations and changes may be made by others without departing from the spirit of the present invention. Accordingly, it is expressly intended that all such variations and changes which fall within the spirit and scope of the present invention as defined in the claims be embraced thereby.

What is claimed is:

1. A liquid-solid contacting device comprising:
   a plurality of chambers;
   frame means for mounting said chambers in fixed relation to each other, said frame means including bearing means for rotating the chambers about an axis of rotation;
   valve means for supplying and draining liquid from each of said chambers;
   a supply conduit and a drain conduit respectively associated with one of said chambers and communicating between each of said respective chambers and said valve means;
   said valve means including a pair of cylinders and means for holding one of the cylinders stationary and means for rotating the other cylinder for rotation relative to the stationary cylinder, said cylinders being in axial alignment with each other and having in common said axis of rotation one of said pair of cylinders being within the other of said pair of cylinders;
   said frame means being affixed to the rotary cylinder for simultaneous rotation with the rotary cylinder, said stationary cylinder having a plurality of stationary inlet and outlet ports, said rotary cylinder having a plurality of rotary inlet and outlet ports which rotate as said rotating cylinder rotates, said supply and drain conduits being secured to the rotary inlet and outlet ports and to rotating transitional tubes in said rotary cylinder communicating between said stationary inlet and outlet ports and said rotary inlet and outlet ports, whereby fluid may flow into and out of the chambers through the transitional tubes as the cylinders rotate about the axis of rotation.

2. A liquid-solid contacting device according to claim 1, wherein the number of said rotary inlet and outlet ports is greater than the number of said stationary inlet and outlet ports.

3. A liquid-solid contacting device according to claim 1, wherein said rotary cylinder is receivable within said stationary cylinder so that an outer wall of said rotary cylinder is in contact with an inner wall of said stationary cylinder.

4. A liquid-solid contacting device according to claim 1, said valve means further including means defining a fluid seal disposed between said stationary and said rotary cylinders such that an inner volume of said valve means may be pressurized.

5. A liquid-solid contacting device according to claim 1, wherein said means for holding one of the cylinders stationary includes a frame of a cart and said means for rotating the other cylinder includes a motor means, said motor means being mounted on said cart.

6. A liquid-solid contacting device according to claim 1, wherein said stationary cylinder is positioned substantially within said rotary cylinder.

7. A liquid-solid contacting device according to claim 5, wherein said frame means is supported and guided for rotation with said rotary cylinder by a plurality of rollers, said rollers being guided by a track disposed beneath said frame means.

8. A liquid-solid contacting device according to claim 7, wherein said means for holding one cylinder stationary is the floor.

* * * * *